US011908672B2

(12) United States Patent
Baba et al.

(10) Patent No.: US 11,908,672 B2
(45) Date of Patent: Feb. 20, 2024

(54) PRECURSOR ACCUMULATION IN A SINGLE CHARGE STATE IN MASS SPECTROMETRY

(71) Applicant: DH TECHNOLOGIES DEVELOPMENT PTE. LTD., Singapore (SG)

(72) Inventors: Takashi Baba, Richmond Hill (CA); Pavel Ryumin, Toronto (CA); Igor Chemushevich, Toronto (CA)

(73) Assignee: DH Technologies Development Pte.Ltd., Singapore (SG)

( * ) Notice: Subject to any disclaimer, the term of this patent is extended or adjusted under 35 U.S.C. 154(b) by 530 days.

(21) Appl. No.: 17/255,597

(22) PCT Filed: Aug. 15, 2019

(86) PCT No.: PCT/IB2019/056935
§ 371 (c)(1),
(2) Date: Dec. 23, 2020

(87) PCT Pub. No.: WO2020/044159
PCT Pub. Date: Mar. 5, 2020

(65) Prior Publication Data

US 2021/0272787 A1 Sep. 2, 2021

Related U.S. Application Data

(60) Provisional application No. 62/724,495, filed on Aug. 29, 2018.

(51) Int. Cl.
*H01J 49/00* (2006.01)
*H01J 49/06* (2006.01)
(Continued)

(52) U.S. Cl.
CPC ...... *H01J 49/0077* (2013.01); *H01J 49/0031* (2013.01); *H01J 49/063* (2013.01); *H01J 49/165* (2013.01); *H01J 49/4215* (2013.01)

(58) Field of Classification Search
CPC ........ H01J 49/00; H01J 49/02; H01J 49/0077; H01J 49/0031; H01J 49/063; H01J 49/165; H01J 49/4215
(Continued)

(56) References Cited

U.S. PATENT DOCUMENTS

2009/0230302 A1* 9/2009 Hunt .................. H01J 49/0072 250/282
2016/0020082 A1 1/2016 Yoshinari et al.
(Continued)

FOREIGN PATENT DOCUMENTS

EP 2388798 B1 8/2016
JP 6229790 B2 11/2017
WO 2017-221151 A1 12/2017

OTHER PUBLICATIONS

International Search Report and Written Opinion for PCT/IB2019/056935, dated Jan. 15, 2020.

*Primary Examiner* — Jason L McCormack
(74) *Attorney, Agent, or Firm* — Kasha Law LLC; John R. Kasha; Kelly L. Kasha

(57) ABSTRACT

An ion source ionizes a compound, producing precursor ions with different m/z values. A reagent source supplies charge reducing reagent. An ion guide is positioned between a mass filter and both the ion source and the reagent source. The ion guide applies an AC voltage and DC voltage to its electrodes that creates a pseudopotential to trap the precursor ions in the ion guide below a threshold m/z. This AC voltage, in turn, causes the trapped precursor ions to be charge reduced by the reagent so that m/z values of the trapped precursor ions increase to a single m/z value above the threshold m/z.
(Continued)

The ion guide applies the DC voltage to its electrodes relative to a DC voltage applied to electrodes of the mass filter that causes the precursor ions with m/z values increased to the single m/z value to be continuously transmitted to the mass filter.

15 Claims, 11 Drawing Sheets

(51) Int. Cl.
*H01J 49/16* (2006.01)
*H01J 49/42* (2006.01)

(58) Field of Classification Search
USPC .......................................... 250/281, 282, 288
See application file for complete search history.

(56) References Cited

U.S. PATENT DOCUMENTS

| | | | | |
|---|---|---|---|---|
| 2018/0005810 | A1 | 1/2018 | Baba | |
| 2019/0378703 | A1 * | 12/2019 | Baba .................. | H01J 49/0072 |
| 2020/0051800 | A1 * | 2/2020 | McAlister ........... | H01J 49/0031 |

* cited by examiner

PRECURSOR ACCUMULATION IN A SINGLE CHARGE STATE IN MASS SPECTROMETRY

RELATED APPLICATIONS

This application claims the benefit of U.S. Provisional Patent Application Ser. No. 62/724,495, filed on Aug. 29, 2018, the content of which is incorporated by reference herein in its entirety.

INTRODUCTION

The teachings herein relate to mass spectrometry apparatus for reducing the charge of precursor ions of the same compound that have different mass-to-charge ratio (m/z) values in order to continuously accumulate and transmit the precursor ions at a single m/z value with a preset z charge state (z). More specifically, a Q0 ion guide is positioned between a Q1 mass filter device and both an ion source device and a reagent source device. The ion source device and the reagent source device are operated simultaneously or sequentially in time in various embodiments. The Q0 ion guide traps charge reducing reagent and two or more precursor ions with m/z values below a threshold m/z value using a pseudopotential created by an alternating current (AC) voltage that is applied on the lens electrode at the exit of the Q0 ion guide or on the Q0 ion guide. A DC voltage is also applied on the lens electrode, where the DC bias on the lens electrode is negative (positive) relative to the DC bias on the Q0 ion guide for the positively (negatively) charged precursor ions as well for the charge reduced ions. This AC voltage, in turn, causes the trapped two or more precursor ions to be charge reduced so that their m/z values increase to a single m/z value above the threshold m/z. The two or more precursor ions with m/z values increased to the single m/z value are continuously transmitted to the Q1 mass filter device by applying a direct current (DC) voltage to the Q0 ion guide device relative to a DC voltage applied to the Q1 mass filter device. The Q1 selects (or isolates) the charge reduced species with the single m/z value to select the target compound with the preset charge state. Using this method, the intensity of the isolated precursor is a sum of precursor ions with originally different charge states higher than the preset value given by the preset threshold.

The apparatus and methods disclosed herein are also performed in conjunction with a processor, controller, microcontroller, or computer system, such as the computer system of FIG. 1.

Precursor Ions with Different Charge States

In mass spectrometry, electrospray ionization (ESI), for example, can cause the precursor ions to have many different charge states. Since the mass-to-charge ratio (m/z) of the precursor ions is dependent upon charge, this, in turn, causes the precursor ions to have a large range of different m/z values in the case of large biological molecules such as proteins.

FIG. 2 is an exemplary plot 200 of a precursor ion mass spectrum for pure myoglobin showing how electrospray ionization (ESI) can produce precursor ions with many different m/z values. For example, bracket 210 shows that ESI of myoglobin can produce, at least, 17 precursor ions with different m/z values between 771 and 2000.

In many conventional experiments, just one of the precursor ions of myoglobin is selected for analysis using a quadrupole ion filter (or Q1). For example, only the precursor ion of myoglobin with an m/z of 1413.82 is selected for fragmentation in a mass spectrometry/mass spectrometry (MS/MS) experiment. Selecting just one precursor ion means that the remainder of the precursor ions under bracket 210 with different m/z values are not examined or lost.

Selecting just one precursor ion reduces the overall sensitivity of the measurement. Sensitivity is, for example, the observed change in ion current per molecule of interest. By choosing only the precursor ion of a myoglobin with an m/z of 1413.82, ion current from the remaining 16 precursor ions is lost, reducing the overall sensitivity.

One method of recapturing sensitivity is to abandon isolation of a single precursor ion and to apply MS/MS to all precursor ions. In other words, the 17 precursor ions of bracket 210 are selected from background noise ions out of bracket 210 by the Q1 set at a wide band transmission to cover the precursor ions in the bracket 210. Unfortunately, this method often cannot be applied when a sample contains more than one protein or additional contaminants. In such cases, it may not be possible to distinguish precursor ions of the protein of interest from precursor ions of other proteins or contaminants.

Another method of recapturing sensitivity is to essentially move two or more precursor ions to the same m/z value. McLuckey et al., Anal. Chem. 2002, 74, 336-346, (hereinafter the "McLuckey Paper") provide a method of moving precursor ions they referred to as "ion parking." The McLuckey Paper describes that before the development of the ion parking technique it was well known that the ion charge associated with high-mass multiply charged ions could be manipulated.

For example, it was known that ions accumulated in an ion trapping instrument could be mixed with a strong neutral base gas, producing an ion/molecule reaction that reduces the charge state of the ions. Similarly, it was known that accumulated ions could also be mixed with ions of the opposite charge producing a proton transfer reaction (PTR) to also reduce the charge state of the ions.

The McLuckey Paper, however, introduced a new technique in which the rate of an ion/ion PTR is inhibited in a selective fashion such that only particular ions are maintained in the trap. The McLuckey Paper refers to this inhibition of an ion/ion PTR as "ion parking". In order to inhibit an ion/ion PTR, the technique of the McLuckey Paper applies a dipolar resonance excitation voltage to the endcap electrodes of a 3D quadrupole ion trap. An exemplary resonance excitation voltage described in the McLuckey Paper has a frequency on the order of tens of thousands of Hertz.

The resonance excitation AC voltage is applied at the secular frequency of a target precursor peak at pre-set charge state to excite the species; then a PTR is applied to the group of precursor ions with many charge states. Because the PTR reaction rate is decreased by the high kinetic energy of the precursor ions, PTR is stopped when the precursor charge states or m/z reach the exciting target.

Unfortunately, this approach has not been implemented in commercial instruments because of the complex parameter settings that are needed. Another problem with this approach is that the resonance excitation of the precursor ions is very likely to cause the precursor ions to lose fragile post-translational modification moieties, such as glycosylation. In other words, the resonance excitation of precursor ions can cause the precursor ions to fragment. Still another problem with this approach is that it involves a pulsed release of the PTR ions. PTR ions remain in the trap. They are then released all at once from the trap for selection and analysis. This pulsed release means that a large number of ions may be released at once. The release of a large number of ions at one time can lead to the saturation of a downstream mass analyzer by space charge.

Mass Spectrometry Background

Mass spectrometry (MS) is an analytical technique for detection and quantitation of chemical compounds based on the analysis of m/z values of ions formed from those compounds. MS involves ionization of one or more compounds of interest from a sample, producing precursor ions, and mass analysis of the precursor ions.

Tandem mass spectrometry or mass spectrometry/mass spectrometry (MS/MS) involves ionization of one or more compounds of interest from a sample, selection of one or more precursor ions of the one or more compounds, fragmentation of the one or more precursor ions into product ions, and mass analysis of the product ions.

Both MS and MS/MS can provide qualitative and quantitative information. The measured precursor or product ion spectrum can be used to identify a molecule of interest. The intensities of precursor ions and product ions can also be used to quantitate the amount of the compound present in a sample.

Fragmentation Techniques Background

Electron-based dissociation (ExD), collision-induced dissociation (CID) and ultra violet (UV) or infrared (IR) photo dissociation are often used as fragmentation techniques for tandem mass spectrometry (MS/MS). ExD can include, but is not limited to, electron capture dissociation (ECD), electron transfer dissociation (ETD) and electron impact excitation of ions from organics (EIEIO). CID is the most conventional technique for dissociation in tandem mass spectrometers.

SUMMARY

An apparatus, method, and computer program product are disclosed for reducing the charge of precursor ions of the same compound that have different m/z values in order to continuously accumulate and transmit the precursor ions at a single m/z value. The apparatus includes an ion source device, a reagent source device, a mass filter device, and ion guide device.

The ion source device ionizes a compound of a sample. This produces two or more precursor ions of the compound with different m/z values. The reagent source device supplies charge reducing reagent.

The ion guide device is positioned between the mass filter device and both the ion source device and the reagent source device. The ion guide device receives the two or more precursor ions from the ion source device and the charge reducing reagent from the reagent source device.

The ion guide device applies an AC voltage and a DC voltage to one or more electrodes of the ion guide device that creates a pseudopotential to trap the received two or more precursor ions with m/z values below a threshold m/z in the ion guide device. This AC voltage, in turn, causes the trapped two or more precursor ions to be charge reduced by the received charge reducing reagent so that m/z values of the two or more precursor ions increase to a single m/z value above the threshold m/z. The ion guide device also applies the DC voltage to the one or more electrodes of the ion guide device relative to a DC voltage applied to electrodes of the mass filter device that causes the two or more precursor ions with m/z values increased to the single m/z value to be continuously transmitted to the mass filter device.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Figure 1:
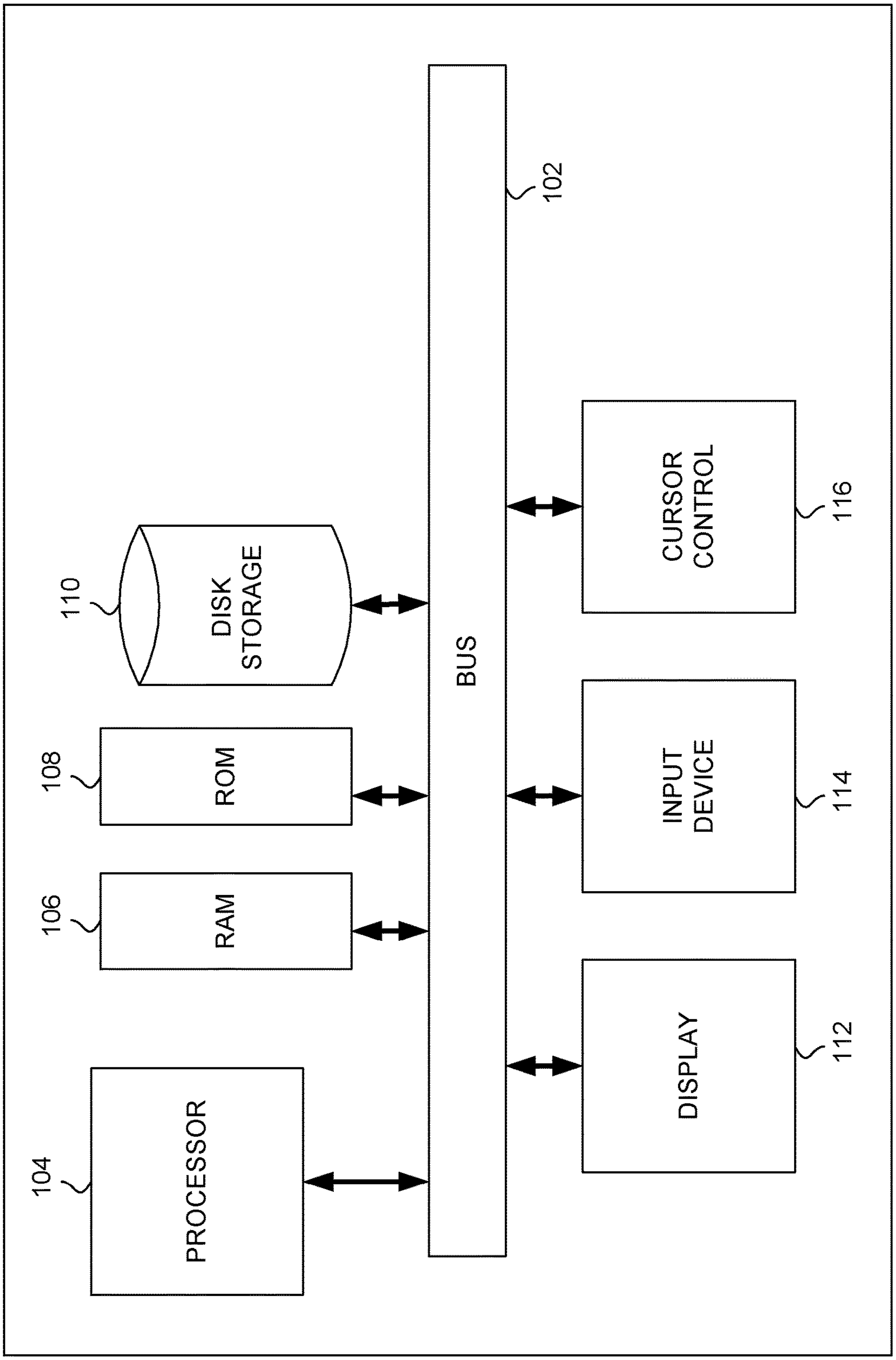
FIG. 1 is a block diagram that illustrates a computer system, upon which embodiments of the present teachings may be implemented.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings Thus implementations of the present teachings are not limited to any specific combination of hardware circuitry and software.

In various embodiments, computer system 100 can be connected to one or more other computer systems, like computer system 100, across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software, but the present teachings may be implemented as a combination of hardware and software or in hardware alone. The present teachings may be implemented with both object-oriented and non-object-oriented programming systems.

Pseudopotential Ion Accumulation and Charge Reduction

As described above and as shown in FIG. 2, electrospray ionization (ESI) can cause, for example, the precursor ions of proteins to have many different charge states. Since the mass-to-charge ratio (m/z) of precursor ions is dependent upon charge, this, in turn, can cause the precursor ions of a single protein to have a large number of different m/z values.

In many experiments, just one of the precursor ions of a compound of interest is selected for analysis. This, however, reduces the overall sensitivity of the analysis. One method of recapturing sensitivity is to essentially move two or more precursor ions to the same m/z value. The McLuckey Paper provides a method of moving precursor ions which is referred to as ion parking. In this method, an ion/ion proton transfer reaction (PTR) is inhibited at a selected charge state or m/z value by applying a resonance excitation voltage to the endcap electrodes of a 3D quadrupole ion trap. Unfortunately, this approach requires complex parameter settings, can cause precursor ions to fragment, and can cause saturation problems due to the pulsed release of charged reduced precursor ions.

In various embodiments, precursor ions are accumulated at the same charge state in an ion guide without using resonance excitation. Instead, an additional alternating current (AC) voltage is applied to all the rods of the ion guide or to an exit aperture or lens of the ion guide to create a pseudopotential voltage barrier over which only precursor ions that have reached a certain m/z value can be transmitted In the McLuckey Paper, the additional AC resonance excitation applied to the ion trap is given a frequency corresponding to the m/z value at which charge reduction is inhibited. This frequency causes ions at this m/z value to be excited with a higher kinetic energy preventing them from reacting with the charge reducing reagent. Unfortunately, this higher kinetic energy can also cause these precursor ions to fragment.

In contrast, the additional AC voltage applied to the ion guide, in various embodiments, creates a pseudopotential barrier that prevents precursor ions with m/z values below a threshold m/z value from moving in the axial direction between the Q0 ion guide and the Q1 filter. This allows them to continue to react with the charge reducing reagent. The amplitude of the additional AC voltage is proportional to the square root of the threshold m/z value. As a result, lowering the amplitude of the AC voltage lowers the threshold m/z value.

In the case of ion parking applied to a linear RFQ like Q0, the AC voltage is applied in radial direction to excite the secular frequency of a charge reduced species. In contrast, in various embodiments, the AC voltage is applied in the axial direction, which does not induce resonant excitation in the radial direction. Instead it produces a potential barrier between the Q0 ion guide rods at the exit of the Q0 ion guide. There are, at least, two options to apply the AC voltage to the Q0 ion guide. One is that the AC voltage is applied on the Q0 rods to apply the AC field between the Q0 rod set and the lens electrode placed at the exit of the Q0 (or IQ1 electrode) ion guide. Another option is that the AC voltage is applied at the IQ1 electrode.

To generate mass selective threshold, DC bias is applied between the IQ1 electrode and the Q0 ion guide. For positively charged precursor ions, IQ1 is set negatively relative to the Q0 ion guide. For negatively charged precursor ions, IQ1 is set at positively relative to the Q0 ion guide.

In a quadrupole ion guide, for example, appropriate radio frequency (RF) voltages are applied to opposed pairs of electrodes within the ion guide in order to confine ions radially. In various embodiments, the additional AC voltage is superimposed over the RF voltage in order to produce a pseudopotential barrier in the axial direction at the exit of the Q0. Background information about pseudopotentials can be found in Gerlich, RF Ion Guides, in "The Encyclopedia of Mass Spectrometry," Vol 1, 182-194 (2003), which is incorporated herein by reference.

U.S. Pat. No. 7,456,388 (hereinafter the "'388 patent") issued on Nov. 25, 2008, and incorporated herein by reference, for example, describes an ion guide for concentrating ion packets. The '388 patent provides apparatus and methods that allow, for example, analysis of ions over broad m/z ranges with virtually no transmission losses. The ejection of ions from an ion guide is affected by creating conditions where all ions (regardless of m/z) may be made to arrive at a designated point in space, such as for example an extraction region or accelerator of a time-of-flight (TOF) mass analyzer, in a desired sequence or at a desired time and with roughly the same energy. Ions bunched in such a way can then be manipulated as a group, for example, by being extracted using a TOF extraction pulse and propelled along a desired path in order to arrive at the same spot on a TOF detector.

In order to eject ions from an ion guide so that all ions arrive at a desired location, at a desired time, and with roughly the same energy, the '388 patent applies an additional AC voltage to the ion guide. This additional AC voltage creates a pseudopotential barrier. In the '388 patent, the amplitude of the AC voltage is first set to allow only the ejection of the ions with the largest m/z value. Then, the amplitude of the AC voltage is gradually reduced in steps to change the depth of the pseudopotential well and allow ions with smaller and smaller m/z values to be ejected from the ion guide. In other words, in the '388 patent, the AC voltage amplitude is scanned.

In various embodiments, the AC voltage applied to an ion guide is not scanned. One AC voltage amplitude is set to correspond to the m/z threshold. In addition, the AC voltage is not used to sequentially eject ions of different m/z values. Instead, the AC voltage is used to create a barrier over which ions that reach the threshold m/z value after charge reduction due to a PTR are continuously ejected.

Figure 3:
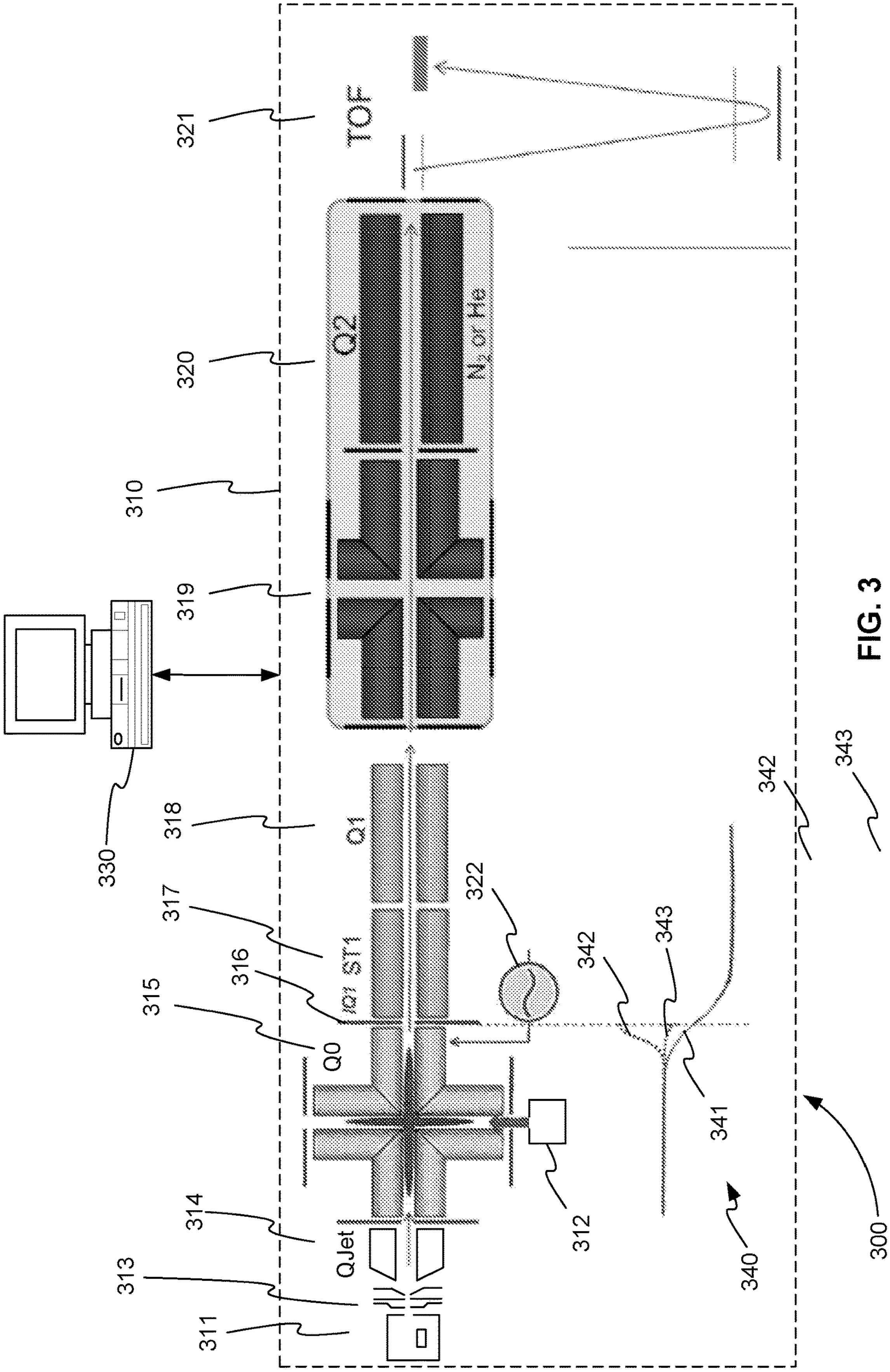
FIG. 3 is a schematic diagram of apparatus for reducing the charge of precursor ions of the same compound that have different m/z values in order to continuously accumulate and transmit the precursor ions at a single m/z value using an ion guide where sample ions and reagent are received through different ports simultaneously, in accordance with various embodiments.

FIG. 3 is a schematic diagram 300 of apparatus for reducing the charge of precursor ions of the same compound that have different m/z values in order to continuously accumulate and transmit the precursor ions at a single m/z value using an ion guide where sample ions and reagent are received through different ports simultaneously, in accordance with various embodiments. The apparatus of FIG. 3 includes ion source device 311, reagent source device 312, Q1 mass filter device 318, and Q0 ion guide device 315. The apparatus is part of mass spectrometer 310, for example.

Figure 2:
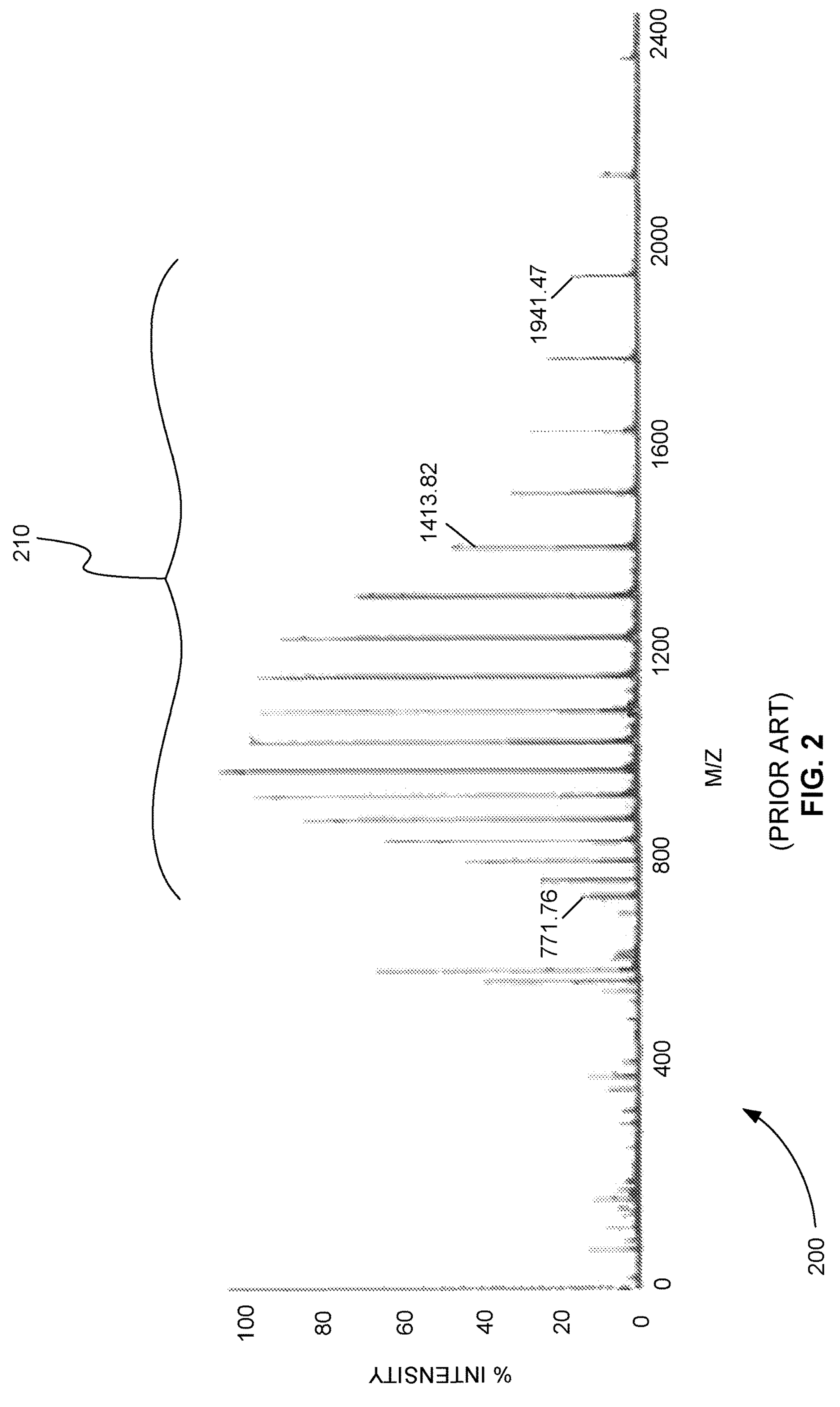
(PRIOR ART) FIG. 2
FIG. 2 is an exemplary plot of a precursor ion mass spectrum for pure myoglobin showing how electrospray ionization (ESI) can produce precursor ions with many different mass-to-charge ratio (m/z) values.

Ion source device 311 ionizes a compound of a sample, producing two or more precursor ions of the compound with different m/z values. The two or more precursor ions are received by Q0 ion guide device 315 through orifice and skimmer 313 and QJet 314, for example. Two or more precursor ions of the compound myoglobin with different m/z values are shown in FIG. 2, for example.

Returning to FIG. 3, reagent source device 312 supplies Q0 ion guide device 315 with a PTR reagent. The two or more precursor ions and the PTR reagent are simultaneously and continuously supplied to Q0 ion guide device 315. This is possible because Q0 ion guide device 315 includes at least two separate entrance ports.

Figure 4:
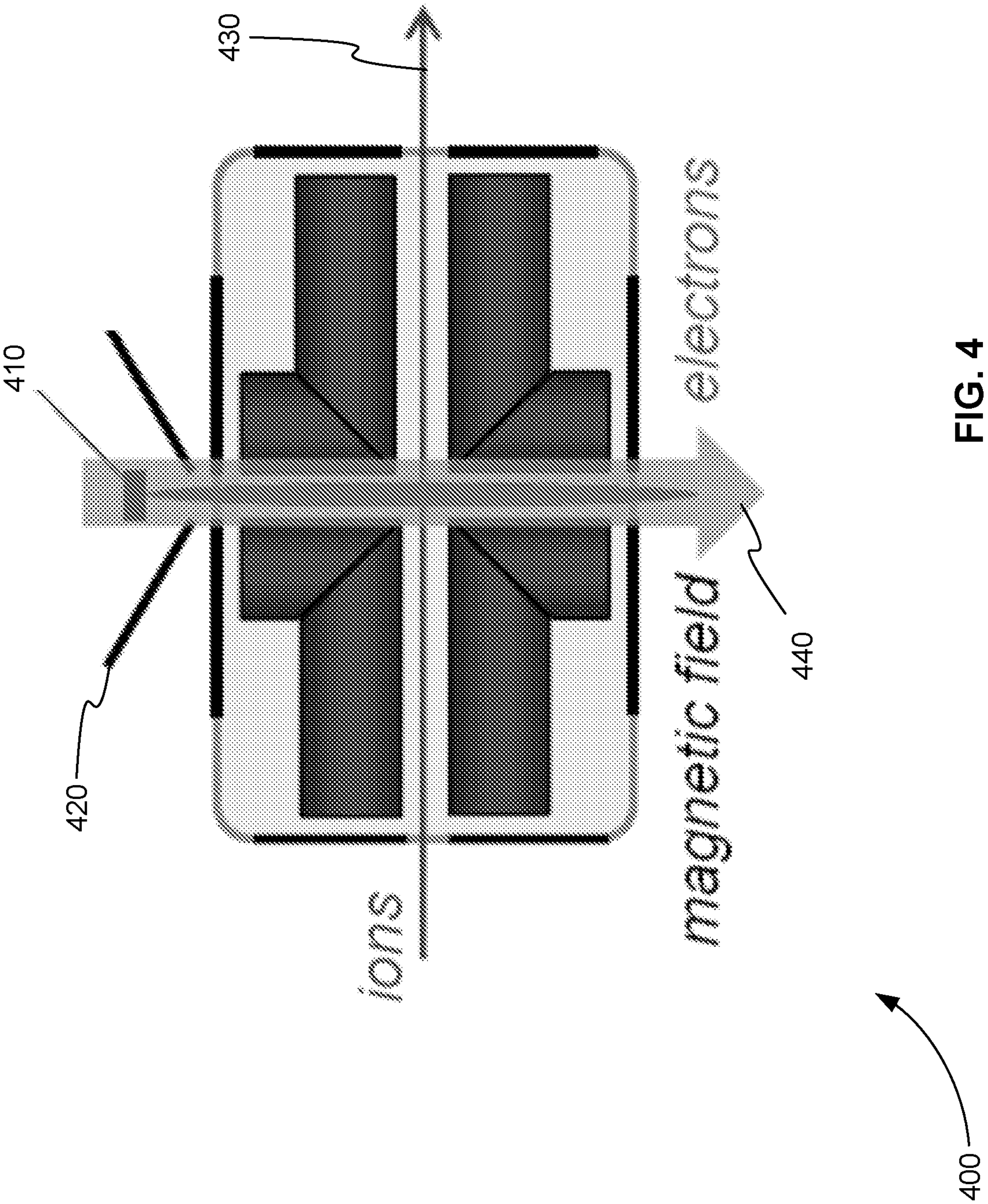
FIG. 4 is a schematic diagram of a Chimera device configured as a collision cell, in accordance with various embodiments.
Figure 5:
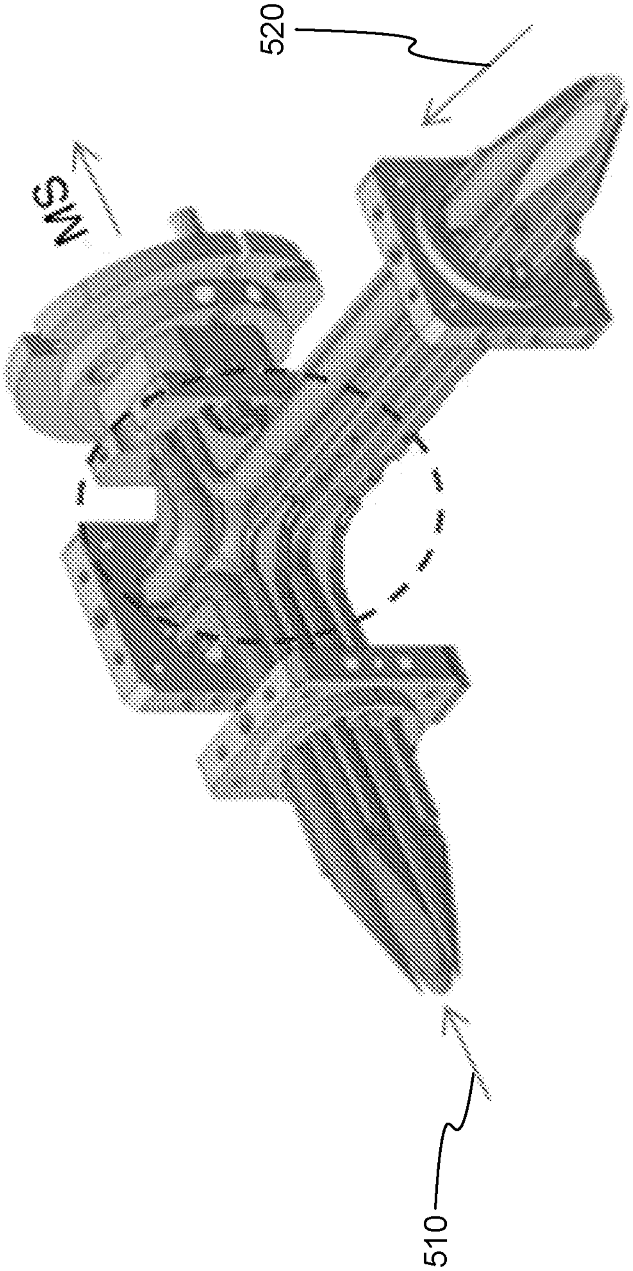
FIG. 5 is a three-dimensional perspective view of a Chimera device, in accordance with various embodiments.

Q0 ion guide device 315 is, for example, a Chimera device that is also shown in FIGS. 4 and 5. A Chimera device includes eight L-shaped electrodes providing four branches. One aligned pair of branches receives the two or more precursor ions from ion source device 311. Simultaneously, another aligned pair of branches receives the PTR reagent from reagent source device 312.

FIG. 4 is a schematic diagram 400 of a Chimera device configured as an ExD cell, in accordance with various embodiments. The Chimera device for ExD includes electron emitter or filament 410 and electron gate 420. Electrons are emitted perpendicular to the flow of ions 430 and parallel to the direction of magnetic field 440.

Returning to FIG. 3, Q0 ion guide device 315 is not used for fragmentation, so the Chimera device does not need to include an electron source or any other devices necessary for performing ExD.

FIG. 5 is a three-dimensional perspective view 500 of a Chimera device, in accordance with various embodiments.

FIG. 5 shows the direction of flow of sample compound ions 510 through the Chimera device. FIG. 5 also shows that a PTR reagent can be added to the Chimera device in direction 520.

Returning to FIG. 3, the two or more precursor ions and the PTR reagent are supplied to Q0 ion guide device 315 composed of a Chimera structure in order to reduce the charge state of the two or more precursor ions. Without some trapping force, however, the two or more precursor ions would simply pass through Q0 ion guide device 315. In order to trap the two or more precursor ions in Q0 ion guide device 315, an AC voltage is applied to all the rods of Q0 ion guide device 315 using AC voltage source 322, for example. In various alternative embodiments, the AC voltage is applied to an electrode of exit aperture or IQ1 lens 316. As described above, the AC voltage produces a pseudopotential experienced by the two or more precursor ions.

Plot 340 depicts the potentials experienced by different precursor ions at different locations in mass spectrometer 310. For example, line 341 depicts the DC potential all precursor ions experience between Q0 ion guide device 315 and mass filter device 318. Line 342 depicts the combined AC and DC (pseudo) potential a precursor ion with an m/z value below the threshold m/z value experiences. Line 342 shows that there is a barrier preventing these ions from moving to Q1 mass filter device 318.

Line 343 depicts the combined AC and DC (pseudo) potential a precursor ion with an m/z value above the threshold m/z value experiences. Line 343 shows that there is no barrier preventing these ions from moving to Q1 mass filter device 318. The reagent ions with the opposite charge sign are trapped always in Q0 without dependence of their m/z values because the DC potential works as trapping barrier.

Plot 340 shows that although the AC voltage traps precursor ions with m/z values below the threshold m/z value, it also allows precursor ions with m/z values above the threshold m/z value to move continuously to mass filter device 318. Because the AC voltage traps precursor ions with m/z values below the threshold m/z value and Q0 ion guide device 315 is supplied with PTR reagent, these trapped precursor ions are charge reduced by the PTR reagent until their m/z values increase above the threshold m/z. In this way, the AC voltage is limiting the PTR.

The PTR reagent can include negatively charged ions, for example. Alternatively, the PTR reagent can include neutral charge scavenger ions, such as ammonia or acetone. In this case, mutual trapping is not required.

DC potential 341 in plot 340 is created, for example, by setting the DC voltage of exit aperture or IQ1 lens 316 lower than the DC voltage of the rods of Q0 ion guide device 315. In addition, the DC voltage of optional ST1 ion guide device 317 is set lower than exit aperture or IQ1 lens 316, and the DC voltage of Q1 mass filter device 318 is set lower than the DC voltage of the rods of Q0 ion guide device 315. By coupling the DC voltages and the pseudopotential produced by the AC voltage near exit aperture or IQ1 lens 316, Q0 ion guide device 315 performs high m/z filter extraction.

Due to the PTR, charge states of the precursor ions in Q0 ion guide device 315 are continuously decreasing and their m/z values are increasing. When the m/z value of the precursor ions reaches a higher m/z than the m/z extraction threshold, the ions are extracted from Q0 ion guide device 315. Because there is no PTR reagent outside of Q0 ion guide device 315, further charge reduction is stopped. This means the charge states of the precursor ions are accumulated at the single value that is determined by the high m/z extraction threshold.

Figure 6:
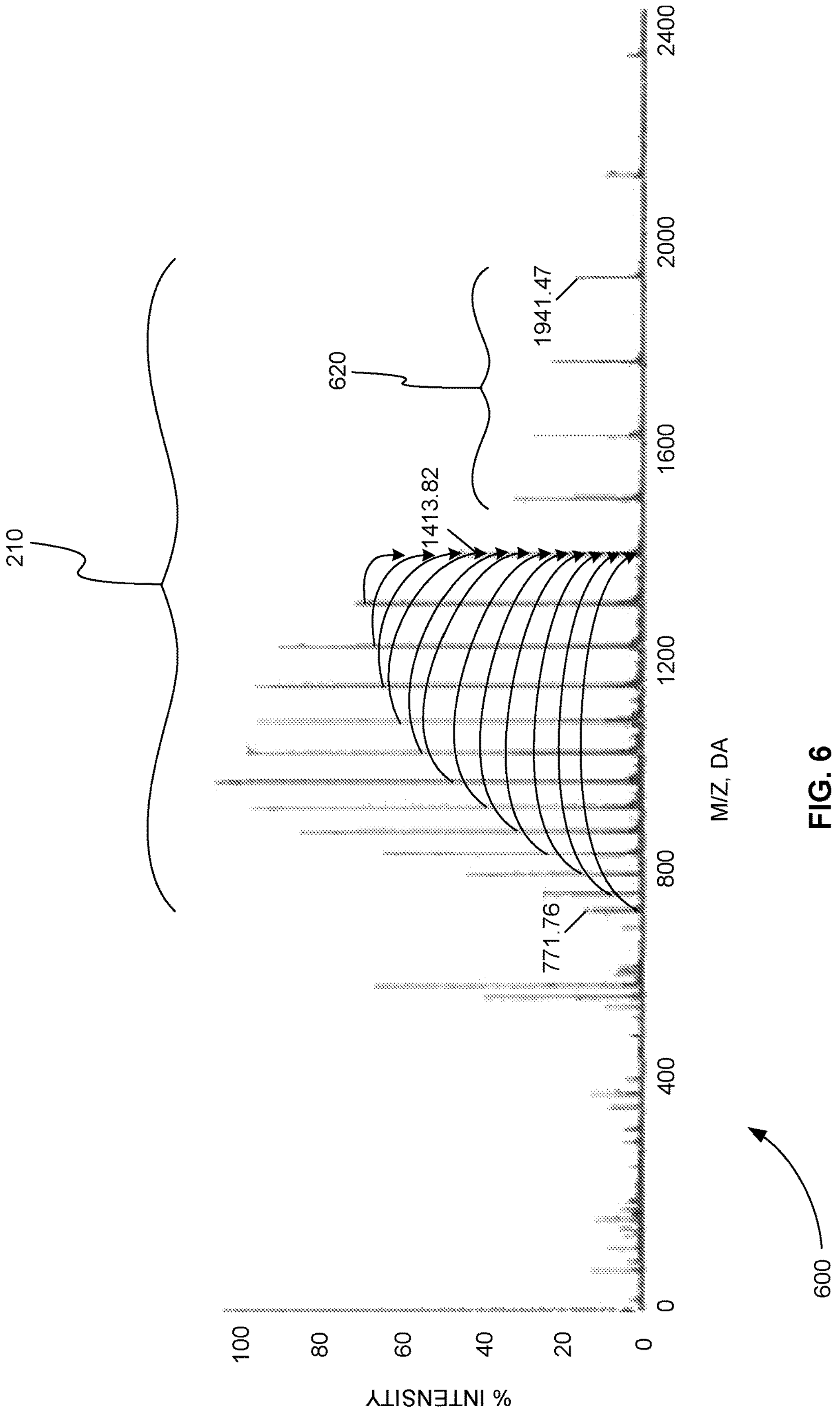
FIG. 6 an exemplary plot of the precursor ions for pure myoglobin showing hypothetically how the m/z values of these precursor ions are increased using the apparatus of FIG. 3, in accordance with various embodiments.

FIG. 6 an exemplary plot 600 of the precursor ions for pure myoglobin showing hypothetically how the m/z values of these precursor ions are increased using the apparatus of FIG. 3, in accordance with various embodiments. Bracket 210 again, for example, delimits, at least, 17 precursor ions of myoglobin with different m/z values between 771 and 2000. However, if an AC voltage is applied to the apparatus of FIG. 3 to create an m/z threshold at about 1413 Da, then the 12 precursor ions of bracket 210 with m/z below 1413 are charge reduced. This causes the m/z values of the 12 precursor ions to be increased to the single m/z of 1413.82, for example, as shown by the arrows in FIG. 6. As a result, the intensities of a total of 13 precursor ions are now found at 1413.83. If this m/z value is now selected and used for mass analysis or fragmentation, the sensitivity is significantly improved.

Bracket 620, however, shows that setting the m/z threshold at 1413 does not consolidate all of the precursor ions at 1413.82 Da. Four precursor ions have m/z values above this value and are transmitted without being charge reduced. Ion current contributions from these four precursor ions are not included if only the single m/z of 1413.82 is selected by the mass filter device. In other words, not setting the m/z threshold close to the m/z value of the precursor ion with the highest m/z value may leave some precursor ions unused.

This is not a significant problem, since gathering ion current from many of the precursor ions that have lower m/z values gives a high percentage of the total possible ion current. In addition, setting the threshold m/z value too high may cause other problems. For example, the mass filter device may not be able to select ions at the highest m/z value of a precursor ion. Also, reaching higher and higher m/z values requires a PTR that is longer in time. In some experiments, there may not be enough time to wait for a PTR to move the precursor ion with the lowest m/z value to the m/z value of the precursor ion with the highest m/z value. Another problem can be lower dissociation efficiency after electron capture in ExD experiments when the precursor charge state is too high.

Figure 7:
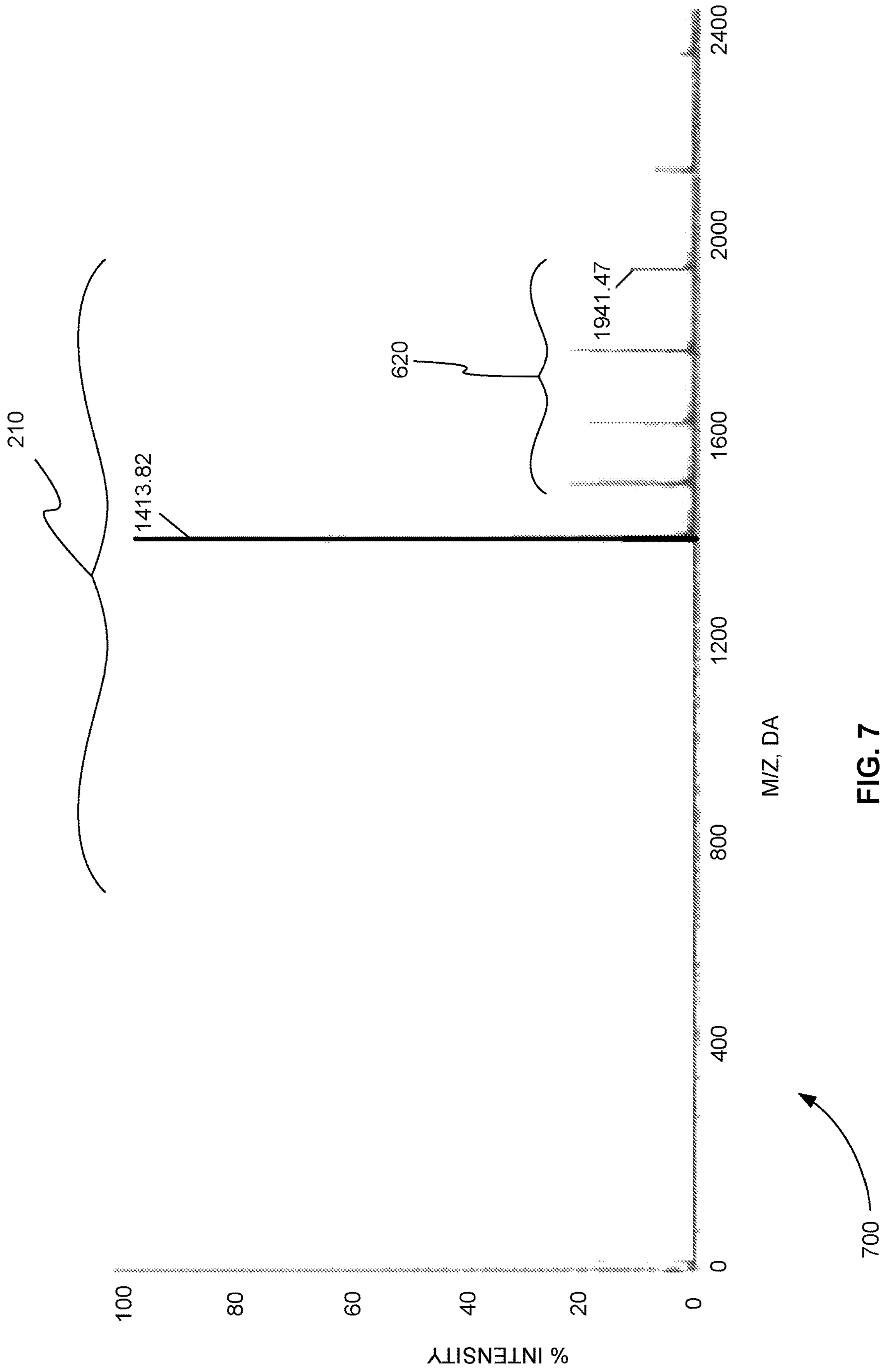
FIG. 7 is an exemplary hypothetical plot of the precursor ions for pure myoglobin that are hypothetically transmitted from the Q0 ion guide device to the Q1 mass filter device of FIG. 3, in accordance with various embodiments.

FIG. 7 is an exemplary hypothetical plot 700 of the precursor ions for pure myoglobin that are hypothetically transmitted from the Q0 ion guide device to the Q1 mass filter device of FIG. 3, in accordance with various embodiments. FIG. 7 shows that Q0 ion guide device 315 of FIG. 3 acts as high m/z extraction filter or high m/z pass filter. Only precursor ions with m/z values above the m/z threshold at about 1413 are now shown in FIG. 7. The precursor ion with an m/z value of 1413.82 now includes the ion current from 13 precursor ions (the original precursor ion and 12 that were charged reduced and moved to this m/z value). Bracket 620 shows that the four precursor ions that have m/z values above the m/z threshold are also still there. In addition, some other high m/z ions are present that may be protein precursor ions, precursor ions from other proteins, or contaminant precursor ions. As a result, Q1 mass filter device 318 of FIG. 3 is used to select the enhanced precursor ion with an m/z value of 1413.82 and remove the remaining precursor ions with different charge states as well as the high m/z contamination ions produced from impurities that are shown in FIG. 7.

Figure 8:
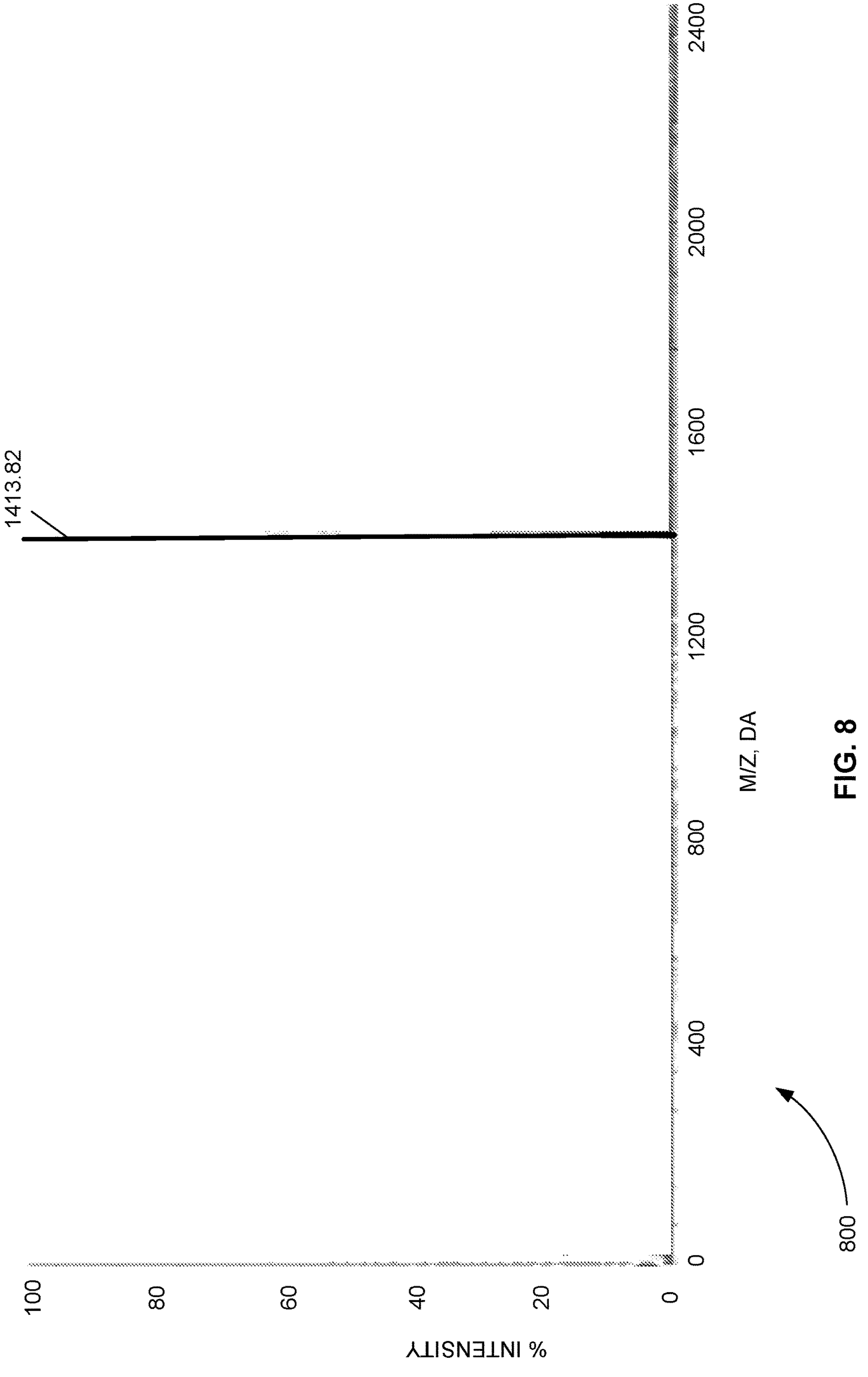
FIG. 8 is an exemplary hypothetical plot of a precursor ion for pure myoglobin that is hypothetically selected and transmitted by the Q1 mass filter device of FIG. 3, in accordance with various embodiments.

FIG. 8 is an exemplary hypothetical plot 800 of a precursor ion for pure myoglobin that is hypothetically selected and transmitted by the Q1 mass filter device of FIG. 3, in accordance with various embodiments. FIG. 8 shows that Q1 mass filter device 318 of FIG. 3 acts as a bandpass m/z extraction filter. Only the precursor ion with an m/z value of 1413.82 that is now shown in FIG. 8 is selected and transmitted. Q1 mass filter device 318 of FIG. 3 effectively removes all other precursor ions with m/z values above the threshold m/z.

Returning to FIG. 3, Q1 mass filter device 318 now transmits this selected precursor ion downstream to other components of mass spectrometer 310 for mass analysis or fragmentation. For example, accumulated and isolated precursor ions allow for sensitive ExD analysis. Mass spectrometer 310 includes a second Q2 Chimera device 319 that can be used to apply ExD to the precursor ion selected by Q1 mass filter device 318, for example. Alternatively, mass spectrometer 310 includes Q2 CID collision cell 320 that can be used to apply CID to the precursor ion selected by Q1 mass filter device 318. Product ions are then mass analyzed by mass analyzer device 321.

In still further alternative embodiments, accumulated and isolated precursor ions may simply be mass analyzed. In this case, the precursor ion selected by Q1 mass filter device 318 is simply transmitted to mass analyzer device 321 by Q2 Chimera device 319 and Q2 CID collision cell 320.

Although Q0 ion guide device 315 filters and charge reduces a continuous flow of precursor ions from ion source device 311, in various embodiments, the ions of Q0 ion guide device 315 are periodically refreshed or dumped to make Q0 ion guide device 315 empty. Periodically emptying Q0 ion guide device 315 prevents the buildup of contaminant ions, for example.

Figure 9:
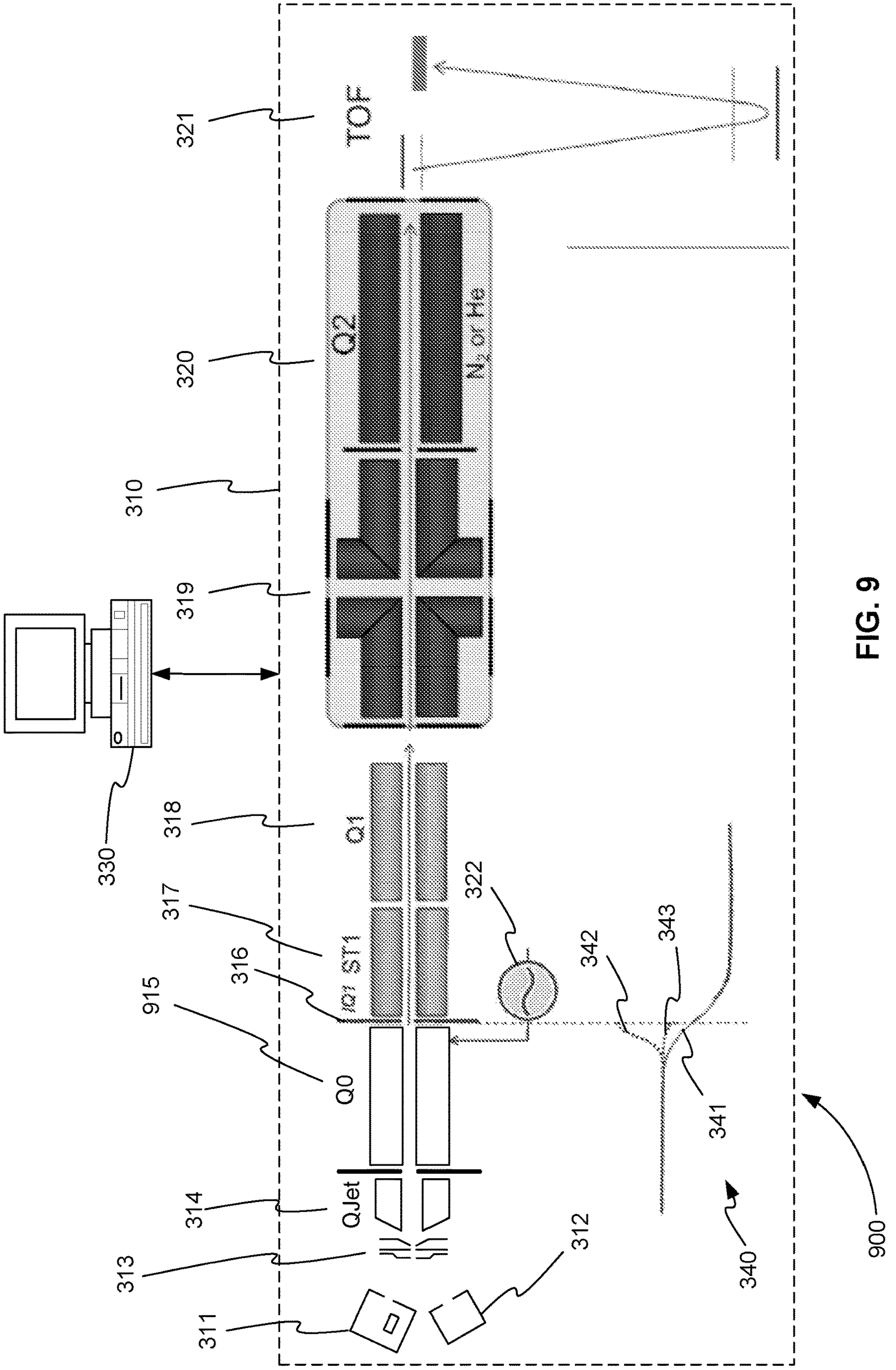
FIG. 9 is a schematic diagram of the apparatus of FIG. 3 where the Q0 ion guide device that receives sample ions and reagent through different ports simultaneously is replaced by a Q0 ion guide device that receives sample ions and reagent separately and sequentially through the same port, in accordance with various embodiments.

FIG. 9 is a schematic diagram 900 of the apparatus of FIG. 3 where the Q0 ion guide device that receives sample ions and reagent through different ports simultaneously is replaced by a Q0 ion guide device that receives sample ions and reagent separately and sequentially through the same port, in accordance with various embodiments. Specifically, the Chimera Q0 ion guide device 315 of FIG. 3 is replaced by a multi-pole Q0 ion guide device 915 in FIG. 9. Multi-pole Q0 ion guide device 915 can be, but is not limited to, a quadrupole, hexapole, or octupole.

Ion source device 311 and reagent source device 312 now transmit their two or more precursor ions and reagent, respectively, to Q0 ion guide device 915 through a single entrance port of Q0 ion guide device 915. The two or more precursor ions and reagent are transmitted through orifice and skimmer 313 and ion guide 314, for example. Since the two or more precursor ions and reagent use the same ion path, they need to be transmitted separately and sequentially. For example, first the two or more precursor ions are transmitted to Q0 ion guide device 915. Then, ion source device 311 is stopped and reagent source device 312 is opened to transmit charge reducing reagent to Q0 ion guide device 915. In various embodiments, charge reducing reagent is introduced through orifice and skimmer 313 and ion guide 314 by reagent source device 312 when negative chemical ionization is used at atmospheric pressure.

Pseudopotential Trapping and Charge Reducing Apparatus

Returning to FIG. 3, mass spectrometer 310 includes apparatus for reducing the charge of precursor ions of the same compound that have different m/z values in order to continuously accumulate and transmit the precursor ions at a single m/z value. This apparatus includes ion source device 311, reagent source device 312, Q1 mass filter device 318, and Q0 ion guide device 315.

Ion source device 311 ionizes a compound of a sample. This produces two or more precursor ions of the compound with different m/z values. Ion source device 311 can be, but is not limited to, an electrospray ion source (ESI) device, an electron impact source and a fast atom bombardment source device, a chemical ionization (CI) source device such as an atmospheric pressure chemical ionization source (APCI) device, atmospheric pressure photoionization (APPI) source device, or a matrix-assisted laser desorption source (MALDI) device. In a preferred embodiment, ion source device 311 is an ESI device.

Reagent source device 312 supplies charge reducing reagent. The charge reducing reagent can be a neutral molecule or charged ions.

Q1 mass filter device 318 is shown as quadrupole. However, Q1 mass filter device 318 can be any type of mass filter, such as a magnetic sector mass spectrometer.

Q0 ion guide device 315 is positioned between Q1 mass filter device 318 and both ion source device 311 and reagent source device 312. Q0 ion guide device 315 receives the two or more precursor ions from ion source device 311 and the charge reducing reagent from reagent source device 312. Q0 ion guide device 315 applies an AC voltage to one or more electrodes of Q0 ion guide device 315 that creates a pseudopotential to trap the received two or more precursor ions with m/z values below a threshold m/z in Q0 ion guide device 315. This AC voltage, in turn, causes the trapped two or more precursor ions to be charge reduced by the received charge reducing reagent so that m/z values of the two or more precursor ions increase to a single m/z value above the threshold m/z. Q0 ion guide device 315 applies a DC voltage to the one or more electrodes of Q0 ion guide device 315 relative to a DC voltage applied to electrodes of mass filter device 318 that causes the two or more precursor ions with m/z values increased to the single m/z value to be continuously transmitted to mass filter device 318.

In various embodiments, the charge reducing reagent supplied by reagent source device 312 can be a neutral charge scavenger reagent. The neutral charge scavenger reagent can include, but is not limited to, ammonia or acetone.

In various alternative embodiments, reagent source device 312 is a PTR reagent source device. The charge reducing reagent includes PTR reagent ions. In addition, and ion guide device 315 applies the AC voltage to mutually trap both the received two or more precursor ions and the received PTR reagent ions with m/z values below the threshold m/z.

In various embodiments, the one or more electrodes of Q0 ion guide device 315 are the rods of Q0 ion guide device 315. In various alternative embodiments, the one or more electrodes of Q0 ion guide device 315 include exit aperture or IQ1 lens 316 of Q0 ion guide device 315.

Returning to FIG. 9, in various embodiments, the two or more precursor ions from ion source device 311 and the charge reducing reagent from reagent source device 312 are received separately and sequentially by the same entrance of Q0 ion guide device 915. The two or more precursor ions from ion source device 311 and the charge reducing reagent from reagent source device 312 are introduced through orifice and skimmer 313 and ion guide 314 separately and sequentially to the same entrance of Q0 ion guide device 915. Q0 ion guide device 915 is, for example, a multi-pole ion guide. Q0 ion guide device 915 can be, but is not limited to, a quadrupole, hexapole, or octupole ion guide device.

Returning to FIG. 3, in various embodiments, the two or more precursor ions from ion source device 311 and the charge reducing reagent from reagent source device 312 are received continuously and simultaneously at different entrances of Q0 ion guide device 315.

In various embodiments, Q0 ion guide device 315 is a Chimera device. This device includes eight L-shaped electrodes, providing four branches. One aligned pair of branches receives the two or more precursor ions from ion source device 311. Simultaneously another aligned pair of branches receives the charge reducing reagent from reagent source device 312.

In various embodiments, second ST1 ion guide device 317 is positioned between Q0 ion guide device 315 and Q1 mass filter device 318. Q0 ion guide device 315 applies a DC voltage to the one or more electrodes of Q0 ion guide device 315 relative to a DC voltage applied to electrodes of second ST1 ion guide device 317 and relative to a DC voltage applied to electrodes of Q1 mass filter device 318. The DC voltage applied to the one or more electrodes of Q0 ion guide device 315 causes the two or more precursor ions with m/z values increased to the single m/z value to be continuously transmitted through second ST1 ion guide device 317 and to Q1 mass filter device 318.

In various embodiments, an ExD device is positioned after Q1 mass filter device 318. This ExD device is, for example, second Q2 Chimera device 319. Q1 mass filter device 318 selects the two or more precursor ions with m/z values increased to the single m/z value and transmits the two or more precursor ions with m/z values increased to the single m/z value to the ExD device. The ExD device fragments the two or more precursor ions with m/z values increased to the single m/z value.

In various embodiments, processor 330 is used to control or provide instructions to ion source device 311, reagent source device 312, Q1 mass filter device 318, and Q0 ion guide device 315 and to analyze data collected. Processor 330 controls or provides instructions by, for example, controlling one or more voltage, current, or pressure sources (not shown). Processor 330 can be a separate device as shown in FIG. 3 or can be a processor or controller of one or more devices of mass spectrometer 310. Processor 330 can be, but is not limited to, a controller, a computer, a microprocessor, the computer system of FIG. 1, or any device capable of sending and receiving control signals and data.

Method for Pseudopotential Trapping and Charge Reduction

Figure 10:
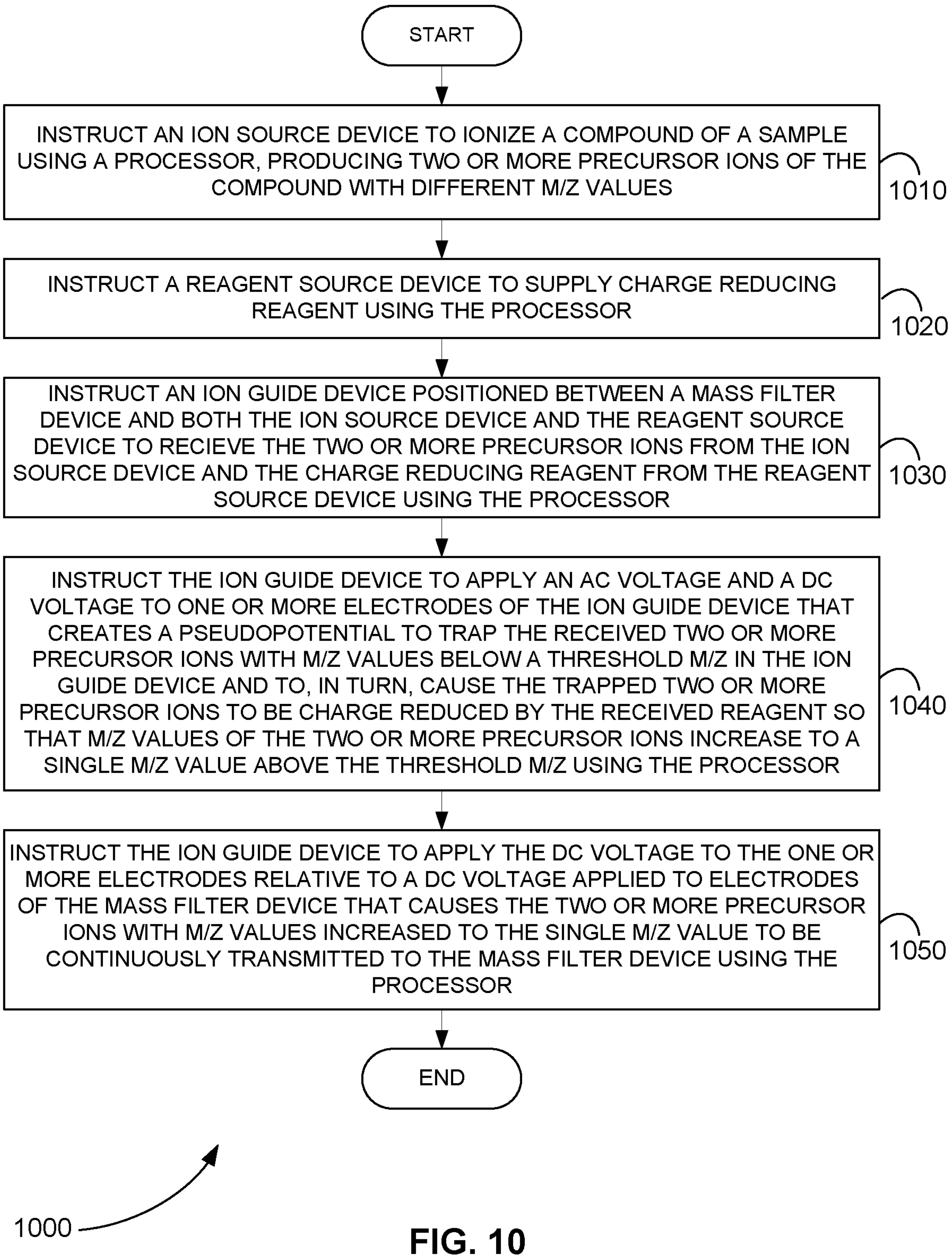
FIG. 10 is a flowchart showing a method for reducing the charge of precursor ions of the same compound that have different m/z values in order to continuously accumulate and transmit the precursor ions at a single m/z value, in accordance with various embodiments.

FIG. 10 is a flowchart showing a method 1000 for reducing the charge of precursor ions of the same compound that have different m/z values in order to continuously accumulate and transmit the precursor ions at a single m/z value, in accordance with various embodiments.

In step 1010 of method 1000, an ion source device is instructed to ionize a compound of a sample using a processor, producing two or more precursor ions of the compound with different m/z values.

In step 1020, a reagent source device is instructed to supply charge reducing reagent using the processor.

In step 1030, an ion guide device positioned between a mass filter device and both the ion source device and the reagent source device is instructed to receive the two or more precursor ions from the ion source device and the charge reducing reagent from the reagent source device using the processor.

In step 1040, the ion guide device is instructed to apply an AC voltage and a DC voltage to one or more electrodes of the ion guide device that creates a pseudopotential to trap the received two or more precursor ions with m/z values below a threshold m/z in the ion guide device using the processor. This AC voltage, in turn, causes the trapped two or more precursor ions to be charge reduced by the received charge reducing reagent so that m/z values of the two or more precursor ions increase to a single m/z value above the threshold m/z.

In step 1050, the ion guide device is instructed to apply the DC voltage to the one or more electrodes relative to a DC voltage applied to electrodes of the mass filter device using the processor. This DC voltage applied to the one or more electrodes of the ion guide device causes the two or more precursor ions with m/z values increased to the single m/z value to be continuously transmitted to the mass filter device.

Computer Program Product for Pseudopotential Trapping and Charge Reduction

In various embodiments, computer program products include a tangible computer-readable storage medium whose contents include a program with instructions being executed on a processor so as to perform a method for reducing the charge of precursor ions of the same compound that have different m/z values in order to continuously accumulate and transmit the precursor ions at a single m/z value. This method is performed by a system that includes one or more distinct software modules.

Figure 11:
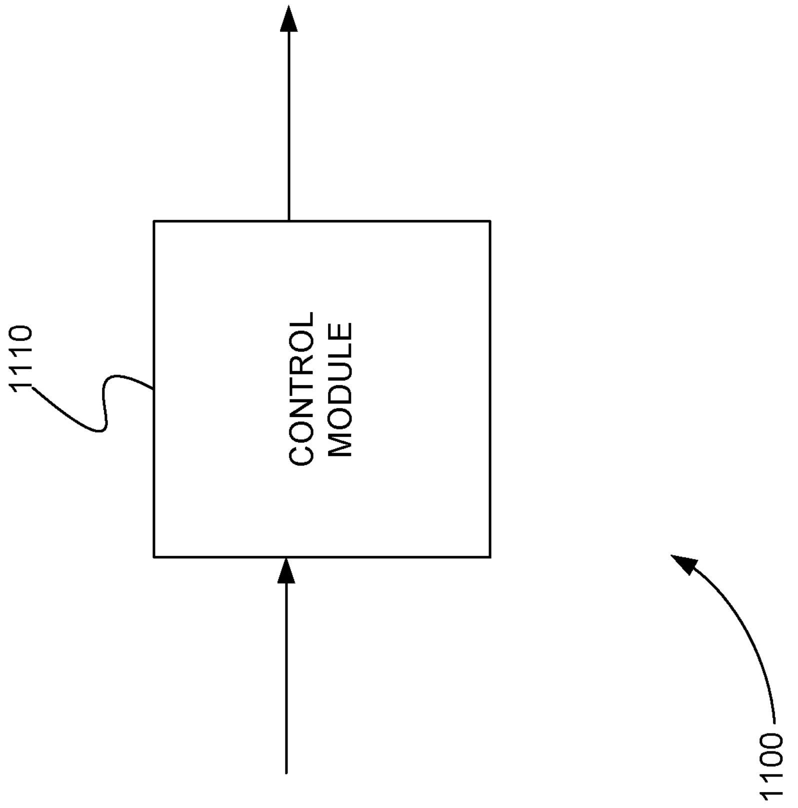
FIG. 11 is a schematic diagram of a system that includes one or more distinct software modules that performs a method for reducing the charge of precursor ions of the same compound that have different m/z values in order to continuously accumulate and transmit the precursor ions at a single m/z value, in accordance with various embodiments.

FIG. 11 is a schematic diagram of a system 1100 that includes one or more distinct software modules that performs a method for reducing the charge of precursor ions of the same compound that have different m/z values in order to continuously accumulate and transmit the precursor ions at a single m/z value, in accordance with various embodiments. System 1100 includes control module 1110.

Control module 1110 instructs an ion source device to ionize a compound of a sample, producing two or more precursor ions of the compound with different m/z values. Control module 1110 instructs a reagent source device to supply charge reducing reagent. Control module 1110 instructs an ion guide device positioned between a mass filter device and both the ion source device and the reagent source device to receive the two or more precursor ions from the ion source device and the charge reducing reagent from the reagent source device.

Control module 1110 instructs the ion guide device to apply an AC voltage and a DC voltage to one or more electrodes of the ion guide device that creates a pseudopotential to trap the received two or more precursor ions with m/z values below a threshold m/z in the ion guide device. This AC voltage, in turn, causes the trapped two or more precursor ions to be charge reduced by the received charge reducing reagent so that m/z values of the two or more precursor ions increase to a single m/z value above the threshold m/z.

Control module 1110 instructs the ion guide device to apply the DC voltage to the one or more electrodes relative to a DC voltage applied to electrodes of the mass filter device. This DC voltage applied to the one or more electrodes of the ion guide device causes the two or more precursor ions with m/z values increased to the single m/z value to be continuously transmitted to the mass filter device.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. Apparatus for reducing the charge of precursor ions of the same compound that have different mass-to-charge ratio (m/z) values in order to continuously accumulate and transmit the precursor ions at a single m/z value, comprising:

an ion source device for ionizing a compound of a sample, producing two or more precursor ions of the compound with different m/z values;

a reagent source device that supplies charge reducing reagent;

a mass filter device; and an ion guide device positioned between the mass filter device and both the ion source device and the reagent source device that receives the two or more precursor ions from the ion source device and the charge reducing reagent from the reagent source device, applies an alternating current (AC) voltage and a direct current (DC) voltage to one or more electrodes of the ion guide device that creates a pseudopotential to trap the received two or more precursor ions with m/z values below a threshold m/z in the ion guide device and to, in turn, cause the trapped two or more precursor ions to be charge reduced by the received charge reducing reagent so that m/z values of the two or more precursor ions increase to a single m/z value above the threshold m/z, and applies the DC voltage to the one or more electrodes relative to a DC voltage applied to electrodes of the mass filter device that causes the two or more precursor ions with m/z values increased to the single m/z value to be continuously transmitted to the mass filter device.

2. The apparatus of claim 1, wherein the charge reducing reagent comprises a neutral charge scavenger reagent.

3. The apparatus of claim 2, wherein the neutral charge scavenger reagent comprises ammonia or acetone.

4. The apparatus of claim 1, wherein the charge reducing reagent source device comprises a proton transfer reaction (PTR) reagent source device, the charge reducing reagent comprises PTR reagent ions, and the ion guide device applies the AC voltage to the one or more electrodes of the ion guide device that creates the pseudopotential to mutually trap both the received two or more precursor ions and the received PTR reagent ions with m/z values below the threshold m/z.

5. The apparatus of claim 1, wherein the one or more electrodes of the ion guide device comprise rods of the ion guide device.

6. The apparatus of claim 1, wherein the one or more electrodes of the ion guide device comprise an electrode of the exit aperture or lens of the ion guide device.

7. The apparatus of claim 1, wherein the two or more precursor ions from the ion source device and the charge reducing reagent from the reagent source device are received separately and sequentially by a same entrance of the ion guide device.

8. The apparatus of claim 7, wherein the two or more precursor ions from the ion source device and the charge reducing reagent from the reagent source device are introduced through an orifice and an ion guide separately and sequentially to the same entrance of the ion guide device.

9. The apparatus of claim 7, wherein the ion guide device comprises a quadrupole, hexapole, or octupole ion guide device.

10. The apparatus of claim 1, wherein the two or more precursor ions from the ion source device and the charge reducing reagent from the reagent source device are received continuously and simultaneously at different entrances of the ion guide device.

11. The apparatus of claim 10, wherein the ion guide device comprises a Chimera device that includes eight L-shaped electrodes providing four branches, wherein one aligned pair of branches receives the two or more precursor ions from the ion source device and simultaneously another aligned pair of branches receives the charge reducing reagent from the reagent source device.

12. The apparatus of claim 10, further comprising a second ion guide device positioned between the ion guide device and the mass filter device, wherein the ion guide device applies a direct current (DC) voltage to the one or more electrodes of the ion guide device relative to a DC voltage applied to electrodes of the second ion guide device and relative to a DC voltage applied to electrodes of the mass filter device that causes the two or more precursor ions with m/z values increased to the single m/z value to be continuously transmitted through the second ion guide device and to the mass filter device.

13. The apparatus of claim 10, further comprising an ExD device positioned after the mass filter device, wherein the mass filter device selects the two or more precursor ions with m/z values increased to the single m/z value and transmits the two or more precursor ions with m/z values increased to the single m/z value to the ExD device, and wherein the ExD device fragments the two or more precursor ions with m/z values increased to the single m/z value.

14. A method for reducing the charge of precursor ions of the same compound that have different mass-to-charge ratio (m/z) values in order to continuously accumulate and transmit the precursor ions at a single m/z value, comprising:

instructing an ion source device to ionize a compound of a sample using a processor, producing two or more precursor ions of the compound with different m/z values;

instructing a reagent source device to supply charge reducing reagent using the processor;

instructing an ion guide device positioned between a mass filter device and both the ion source device and the reagent source device to receive the two or more precursor ions from the ion source device and the charge reducing reagent from the reagent source device using the processor;

instructing the ion guide device to apply an alternating current (AC) voltage and a direct current (DC) voltage to one or more electrodes of the ion guide device that creates a pseudopotential to trap the received two or more precursor ions with m/z values below a threshold m/z in the ion guide device and to, in turn, cause the trapped two or more precursor ions to be charge reduced by the received charge reducing reagent so that m/z values of the two or more precursor ions increase to a single m/z value above the threshold m/z using the processor; and instructing the ion guide device to apply the DC voltage to the one or more electrodes relative to a DC voltage applied to electrodes of the mass filter device that causes the two or more precursor ions with m/z values increased to the single m/z value to be continuously transmitted to the mass filter device using the processor.

15. A computer program product, comprising a non-transitory and tangible computer-readable storage medium whose contents include a program with instructions being executed on a processor so as to perform a method for reducing the charge of precursor ions of the same compound that have different mass-to-charge ratio (m/z) values in order to continuously accumulate and transmit the precursor ions at a single m/z value, the method comprising:

providing a system, wherein the system comprises one or more distinct software modules, and wherein the distinct software modules comprise a control module;

instructing an ion source device to ionize a compound of a sample using the control module, producing two or more precursor ions of the compound with different m/z values;

instructing a reagent source device to supply charge reducing reagent using the control module;

instructing an ion guide device positioned between a mass filter device and both the ion source device and the reagent source device to receive the two or more precursor ions from the ion source device and the charge reducing reagent from the reagent source device using the control module;

instructing the ion guide device to apply an alternating current (AC) voltage and a direct current (DC) voltage to one or more electrodes of the ion guide device that creates a pseudopotential to trap the received two or more precursor ions with m/z values below a threshold m/z in the ion guide device and to, in turn, cause the trapped two or more precursor ions to be charge reduced by the received charge reducing reagent so that m/z values of the two or more precursor ions increase to a single m/z value above the threshold m/z using the control module; and instructing the ion guide device to apply the DC voltage to the one or more electrodes relative to a DC voltage applied to electrodes of the mass filter device that causes the two or more precursor ions with m/z values increased to the single m/z value to be continuously transmitted to the mass filter device using the control module.

* * * * *